United States Patent [19]

Kachik

[11] Patent Number: 4,856,170

[45] Date of Patent: Aug. 15, 1989

[54] REBUILDING WORN HAMMER MILL HAMMERS

[75] Inventor: Robert H. Kachik, Lakehurst, N.J.

[73] Assignee: Orgo-Thermit Inc., Lakehurst, N.J.

[21] Appl. No.: 183,825

[22] Filed: Apr. 21, 1988

[51] Int. Cl.[4] .................................... B23P 15/02

[52] U.S. Cl. ........................ 29/402.18; 29/527.3; 29/527.4; 29/527.6

[58] Field of Search ............ 29/402.18, 527.3, 527.4, 29/527.5, 527.6

[56] References Cited

U.S. PATENT DOCUMENTS 3,349,463 10/1967 Kittelson .................. 79/402.18 X
4,563,801 1/1988 Schill et al. ............. 29/402.18 X

*Primary Examiner*—Timothy V. Eley
*Attorney, Agent, or Firm*—Toren, McGeady & Associates

[57] ABSTRACT

In a hammer mill, such as used for pulverizing coal, or breaking and grinding scrap metal, rock, masonry, refuse and the like, the hammers are exposed to wear. In time, a part of the wearing surface of the hammer is worn away and the hammer becomes less effective. A worn hammer is returned to its original weight and dimensions by depositing a molten exothermic material on the worn surface. The worn hammer is supported and enclosed by a mold so that the worn surface faces upwardly. The exothermic material is ignited and flows into the mold chamber into contact with the worn surface until the desired hammer dimensions and weight are achieved. Excess exothermic material overflows from the mold chamber into a sump. The exothermic material deposits a weld on the worn surface of the hammer which is similar to Ni-Hard, a known wear resistant metal.

7 Claims, 6 Drawing Sheets

REBUILDING WORN HAMMER MILL HAMMERS

BACKGROUND OF THE INVENTION

The present invention is directed to rebuilding hammers used in hammer mills for pulverizing coal and for breaking and grinding metal scrap, rock, masonry, refuse and the like. A worn hammer is rebuilt and returned to its original dimensions and weight by depositing a molten exothermic material on the worn surface. The exothermic material is selected so that the resultant weld is similar to Ni-Hard, a known wear-resistant metal.

In modern steel-making operations, coal is ground to a specific mesh size before coking so that coke of a proper quality for use in modern, high-throughput blast furnaces is available. Coal is pulverized in a hammer mill device, such as the Coalpactor, supplied by the Pennsylvania Crusher Corporation. In such a hammer mill, a large number of hammers, mounted on shafts, are rotated at high speed within a housing for grinding the coal to the desired size. The head of the hammer grinds the coal and, in turn, the grinding or wearing surface becomes worn and loses its effectiveness. When such a hammer loses about one-half inch of its length and about 10 per cent of its weight, the hammer is considered worn out and must be replaced.

In the past, worn hammers have been scrapped. Attempts to increase the life of hammers by conventional hardfacing techniques have not been successful.

In other types of hammer mills, with the hammers providing a crushing or grinding action, the wearing surface of the hammer becomes worn and less efficient, until finally it must be replaced.

In rebuilding worn-out hammers, the rebuilt hammer must closely match the weight and over-all length of a new hammer. Moreover, the cost of rebuilding must be less than the cost of a new hammer or it should provide a significantly longer effective lifetime.

SUMMARY OF THE INVENTION

Therefore, the primary object of the present invention is to provide a method of, and apparatus for, rebuilding worn hammers used in a hammer mill. Further, the invention includes the exothermic material used for rebuilding the hammer and the makeup of the metal layer deposited on the worn wearing surface.

When at least some of the hammers in a coal pulverizer or hammer mill become worn, all of the hammers are removed and replaced. In a typical coal pulverizer, 156 hammers are removed and replaced. The hammers have an elongated shape, with a head at one end and an eye at the other, with the eye mounted on a shaft for rotating the hammers. The hammers are positioned side by side along the shaft. The head has a generally flat wearing surface which provides the grinding or crushing action. During use, the wearing surface is gradually worn away, until the amount of wear requires removal and replacement of the hammers. As mentioned above, the hammers are removed and replaced as a group. In a typical coal pulverizer hammer, when half an inch is worn off the wearing surface, the hammer must be replaced. Depending on the type of operation being carried out by the hammer mill, the size and weight of the hammer may vary greatly. As an example, forged steel paddle hammers are available from the Pennsylvania Crusher Corporation in the range of 12.5 to 53.5 pound sizes. Other hammers, of at least a 200-pound size, are also used in hammer mills.

In rebuilding hammers, the hammer is supported on a frame so that the wearing surface of the head faces upwardly. A mold member is positioned on the support enclosing the head and the wearing surface to be rebuilt. A seal is provided between the mold and the support frame. An amount of a thermite or exothermic material sufficient to rebuild the worn hammer is introduced into a crucible cavity at a location above the molding chamber. Initially, a steel tapping disk blocks flow from the crucible cavity into the molding chamber. After the exothermic mixture is ignited and becomes molten, the steel tapping disc melts and the molten mixture flows into the molding cavity, filling the cavity up to the finished wearing surface of the hammer. Excess molten material flows into a sump. When the molten material freezes within the molding cavity and is welded to the existing hammer surface, and following a predetermined cooling period, the part of the mold remaining around the hammer head is removed, the gate and sump are broken off and, if necessary, any excess weld material is ground away. The weight and the length of the rebuilt hammer is then checked against the hammer specifications.

It is significant in rebuilding smaller hammers, such as hammers weighing 10 to 60 pounds that the dimension between the eye of the hammer and the wearing surface at the end of the hammer head is maintained within very limited tolerances, such as +/− one-sixteenth of an inch in the over-all length of the hammer. Larger hammers, over 60 pounds, have only maximum length requirements.

The apparatus used for rebuilding a worn hammer depends on the over-all size and weight of the hammer. In the smaller range, the hammers can be rebuilt on a support frame. Preferably, the frame is mounted on rollers or wheels so that it can be moved between different locations.

Larger hammers, which cannot be handled manually, require a stationary apparatus for the rebuilding operation.

For smaller-sized hammers an upwardly extending support frame is constructed from angle members. An upwardly facing support surface is provided with shaped recesses to receive the underside of the head, that is the surface of the head opposite the wearing surface. With the precise formation of such a recess, the hammer to be rebuilt can be positioned exactly so that the rebuilt wearing surface is at a predetermined dimension from the opposite end of the hammer.

A graphite plate is mounted on the support surface so that it laterally encloses the lower part of the hammer head. A sealing paste is provided between the graphite plate and the worn hammer head, and also on the upwardly-facing surface of the graphite plate. A mold is placed on the upper surface of the graphite plate with the paste forming a seal between the graphite plate and the lower end of the mold and the lower part of the head. The mold forms a mold chamber which laterally encloses the worn hammer head in closely-fitting relation. In one arrangement of the mold chamber, an upper limiting surface is formed which defines the finished wearing surface of the hammer head, after it is welded.

The mold includes a crucible cavity spaced above the mold chamber with a passageway extending from the lower end of the crucible cavity into the upper end of the mold chamber. A steel tapping disc is seated within a recess in the lower end of the crucible cavity, and forms a closure for the passageway from the cavity into the mold chamber.

In addition, a sump cavity is located within the mold and is connected by an opening with the upper end of the mold chamber.

It is important in forming the support frame that the support surface, on which the hammer head rests within the recess, is flat, smooth and normal to the shank of the hammer. Otherwise, the resulting weld formed by the molten exothermic material will not extend properly from the worn surface on the head. If the weld formed on the head is not normal, but oblique, the rebuilt hammer must be rejected.

For ease in performing the rebuilding operation, it is important that the hammer can be inserted into the support frame downwardly into the recess. The support frame must have a cut-out of adequate size to receive the hammer eye and shank. The graphite plate in combination with the sealing paste affords a seal around the hammer head and prevents leakage of the molten exothermic material, or weld metal, downwardly along the sides of the hammer. The sealing material is a refractory paste applied as a bead around the entire periphery of the hammer head in the region of the graphite plate and as a coating on the graphite plate surface on which the mold is supported.

In the rebuilding operation, the thermite or exothermic material within the crucible cavity is ignited, and after the exothermic reaction is complete, in about 30 seconds, tapping of the molten metal is delayed until the steel tapping disc melts. This delay, about ten seconds, allows time for the molten slag and metal to separate into two layers with the slag floating on top. When the steel tapping disc melts, the superheated molten metal flows downwardly from the crucible cavity into the mold chamber, across the top of the worn hammer head and into the sump cavity. Initially, the molten metal preheats the cold hammer head, which is at ambient temperature, to the welding temperature, and since the opening to the sump cavity is located below the top of the mold chamber, the initial flow passes into the sump cavity. When the sump and the mold chamber are full, flow out of the crucible cavity is stopped, and the metal within the molding chamber freezes on the worn surface of the hammer head, forming a weld. Normally, some weld metal remains in the base of the crucible cavity with the slag collecting on top of the metal. After permitting the molten metal to cool for about 30 minutes, the mold is broken away and the rebuilt hammers can be removed from the stand. After further cooling to near ambient temperature, the gate and sump are fractured off and any remaining excess metal is removed. The rebuilt hammer is then checked to determine if it meets the required specification.

In the apparatus just described, the mold chamber is formed with a closed upper end for defining the finished wearing surface of the rebuilt hammer head. When the size of the hammer is such that a completely enclosed mold chamber is not feasible, an open-top mold chamber is provided. A crucible cavity is provided for flowing the molten exothermic material into the mold chamber over the worn wearing surface of the hammer head. The mold chamber is provided with an overflow outlet, having an invert located at the level in the molding chamber corresponding to the finished rebuilt wearing surface of the hammer. Accordingly, since the initial flow of the molten exothermic material cannot be used to preheat the worn surface of the hammer head, a preheating operation must be performed. With the worn wearing surface preheated, the ignited exothermic material in the molten stage is then passed from the crucible cavity into the molding chamber. When the molten material reaches the level of the invert, it flows into a sump providing a level finished wearing surface on the hammer head.

Based on the weld required to rebuild the hammer head so that it is returned to its original dimensions, the amount of the exothermic mixture to be used is determined. An amount of the exothermic material in excess of the amount required for welding the worn wearing surface of the hammer is provided to assure that the wearing surface is returned to its original dimensions.

An example of an effective exothermic mixture for smaller hammers contains the following components:

| Material | Percent |
|---|---|
| atomized aluminum powder | 21.5 |
| millscale (18% FeO) | 70.2 |
| graphite powder | 2.9 |
| high carbon ferromanganese | 1.0 |
| Nickel Oxide Sinter 75 | 2.9 |
| low carbon ferrochromium | 1.5 |
| | 100.0% |

An example of an effective exothermic material for larger hammers contains the following components:

| Material | Percent |
|---|---|
| atomized aluminum powder | 21.4 |
| millscale (18% FeO) | 69.9 |
| graphite powder | 3.4 |
| high carbon ferromanganese | 1.0 |
| Nickel Oxide Sinter 75 | 2.8 |
| low carbon ferrochromium | 1.5 |
| | 100.0% |

It has been found that the weld metal produced using these exothermic mixtures has basically the same composition as a well-established wear resistant material known as Ni-Hard. In addition to an as-deposited hardness of 50–55 Rc, the microstructure contains a high volume of carbides providing better resistance to abrasive wear than the original steel hammers which have been heat treated to the same degree of hardness. In tests conducted to date, it has been found that hammers rebuilt in accordance with this method have about twice the effective lifetime of new hammers. The deposited weld in accordance with the present invention includes:

| Material | Percent |
|---|---|
| carbon | 3.0 |
| manganese | 0.6 |
| silicon | 1.0 |
| nickel | 4.5 |
| chromium, | 1.5 |

and the remainder iron.

Since smaller hammers are rebuilt in a different procedure then larger hammers, two different exothermic mixtures are required, however, the resultant weld metal composition is essentially the same.

A significant feature of the applicant's invention involves the support of the hammer and the arrangement of the mold on the support so that the rebuilt wearing surface is located at a specific dimension above the hammer eye. Unless this dimension is maintained within close tolerances, the rebuilt hammer does not operate effectively.

In a hammer mill, a plurality of the hammers are mounted in side-by-side relation on a shaft. Accordingly, the wearing surface of the hammer heads have a dimension extending in the direction of rotation of the hammers and another dimension extending perpendicularly of the rotational dimension. The perpendicular dimension is significant, since if this dimension is not maintained within accurate limits there may be interference between the movement of adjacent hammers on the shaft. Accordingly, the dimension extending transversely of the rotational dimension must be kept within close tolerances, however, the dimension in the rotational direction is not as critical. The over-all dimensions, however, must be retained to assure that the weight of the rebuilt hammer does not fall outside the required specification tolerances.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
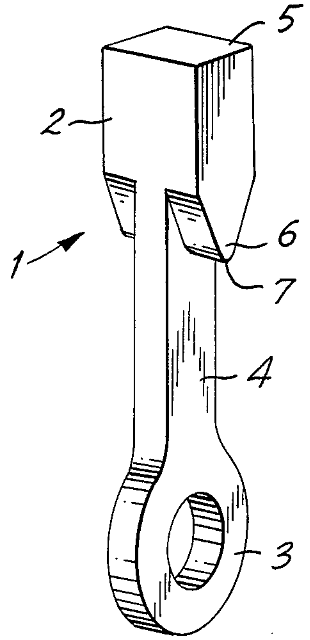
FIG. 1 is a perspective view of a hammer for use in a hammer mill.
Figure 2:
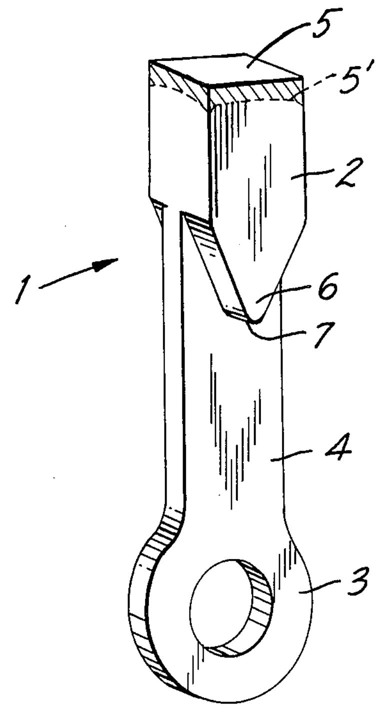
FIG. 2 is a perspective view of the hammer shown in FIG. 1, however, with the hammer turned approximately 90 degrees about the vertical axis.

In FIGS. 1 and 2, perspective views are shown of a hammer 1, characterized above as a smaller hammer, used in a coal pulverizer. The hammer 1 is elongated in the vertical direction, as viewed in FIGS. 1 and 2, with a head 2 at the upper end, an eye 3 at the lower end, and a shank 4, extending between the eye and the head. The upper surface 5 of the head is its wearing surface and cooperates with a stationery housing surface, not illustrated, for pulverizing coal. The lower end of the head 2 has a V-shaped section 6, with a pair of opposite sides converging inwardly in the downward direction and terminating in an apex 7. The V-shaped section 6, with the apex 7, is not significant with regard to the pulverizing operation, however, it is significant concerning the support of the hammer during the rebuilding operation.

During use, the wearing surface 5 is gradually worn away until it is worn down to the dashed line 5*a*, whereby the hatched section between the original wearing surface 5, and the worn surface 5', is worn away. Due to the wear experienced by the hammer, its over-all length has been reduced, its weight decreased, and the hammer can no longer properly crush coal. At this point in the operation of the coal pulverizer, the hammers must be replaced and replacement involves a significant cost. In the past, though the worn hammers have lost only about half an inch in their over-all length, that is between the bottom of the eye 3, and the original wearing surface 5, and about 10% of its weight, the hammer is normally scrapped. Attempts have been made in the past to rebuild the hammers by conventional hardfacing techniques, however, such rebuilding has not been successful.

In FIGS. 1 and 2, the wearing surface 5, is shown as a flat planar surface, however, the wearing surface of conventional hammers, as originally forged, may have a slightly rounded shape, extending in the direction of a rotation due to forging procedure. It is not necessary to provide this slight rounding-off when the hammer is rebuilt.

Figure 3:
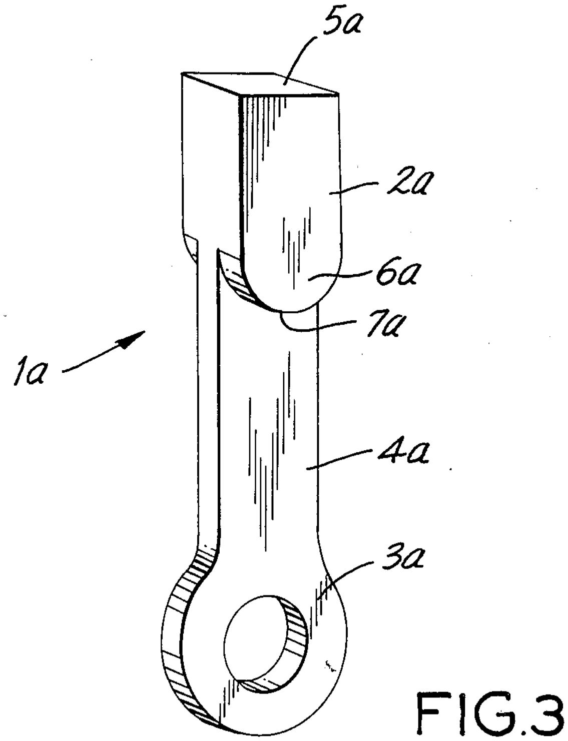
FIG. 3 is a perspective view of another embodiment of a hammer head, however, with a slightly different configuration of the head.

In FIG. 3, another embodiment of a smaller hammer is shown, where the same reference numerals are used as in FIGS. 1 and 2, however, with the addition of the suffix *a*. The hammer 1*a* has a head 2*a* at its upper end, and eye 3*a* at its lower end, with a shank 4*a* interconnecting the head and the eye.

The upper surface 5*a* of the head 2*a* is the original wearing surface before it is exposed to wear. The significant difference from the embodiment shown in FIGS. 1 and 2, is that the shaped section 6 *a* is rounded, rather than wedge or arrowhead shaped.

As can be noted in FIGS. 1 and 2 and in FIG. 3, the eye 3*a* has a maximum diameter greater than the corresponding dimension of the head 2 for effecting adequate structural strength. This dimensional difference is significant regarding the manner in which the hammer is supported during the rebuilding operation.

When it is determined that a hammer mill is no longer operating effectively, due to wear of the individual hammers, all of the hammers are removed, though the extent of wear varies. Further, the size of the hammer has a bearing on the type of apparatus needed to rebuild the wearing surface. If the hammers are in the range of 10 to 60 pounds, it is possible to carry out the rebuilding operation with a relatively lightweight structure, however, as the hammer size increases, particularly to the point where the hammers cannot be handled manually by a single individual, the type of apparatus for rebuilding the wearing surface is significantly different from the support structure for lighter weight or smaller hammers.

Figure 4:
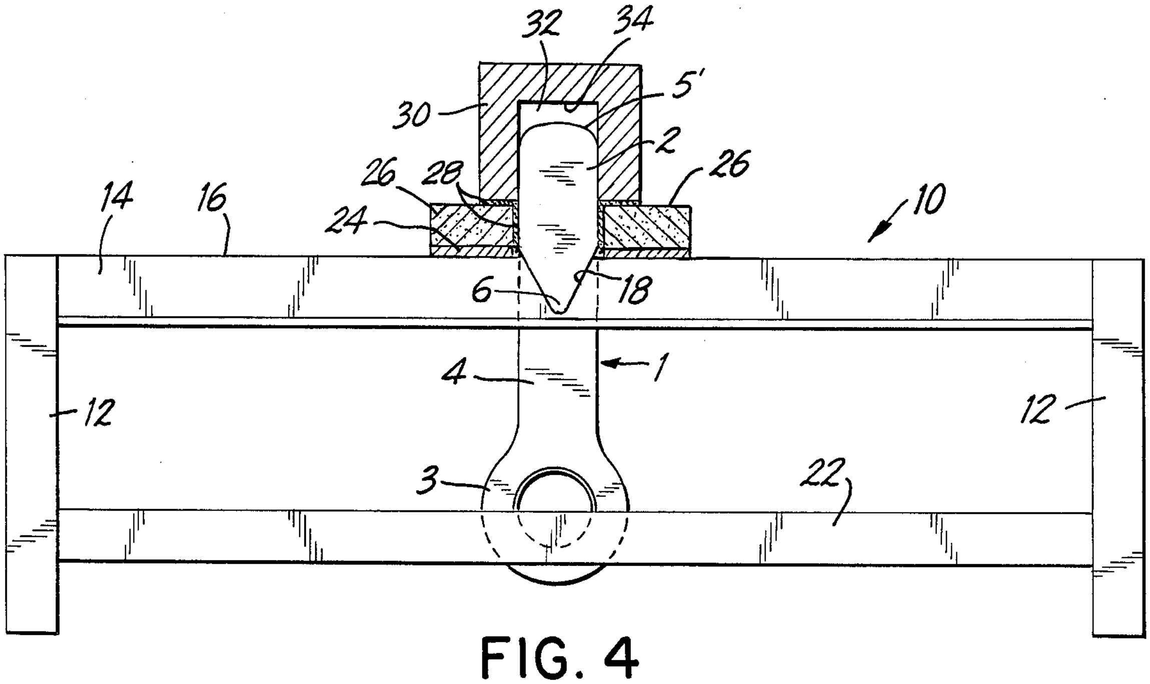
FIG. 4 is an elevational view of a support frame for use in rebuilding a worn hammer.
Figure 5:
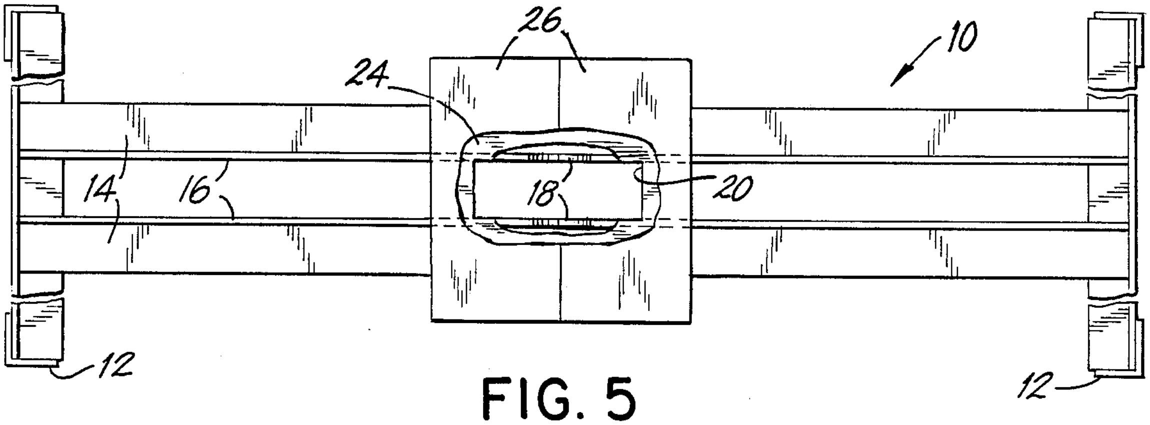
FIG. 5 is a top view of the support frame shown in FIG. 4.
Figure 6:
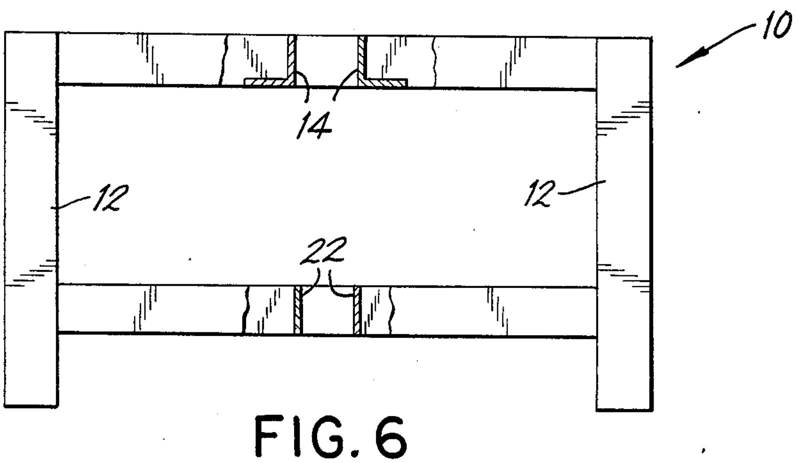
FIG. 6 is an end view of the support frame shown in FIG. 4.

In FIGS. 4, 5, and 6, a support frame 10 is illustrated for rebuilding relatively small coal pulverizer hammers. For example, the hammers, such as illustrated in FIGS. 1 and 2, have an over-all hammer length, as viewed in FIGS. 1 and 2, from the original or rebuilt wearing surface 5, to the lowest point of the eye 3 of $12\frac{5}{8}$ inches with an allowable tolerance of a +/− one-sixteenth of an inch. The weight of such hammers is in the range of 7,495 to 7,595 grams, or slightly under 17 pounds. Such a hammer size is easily handled by a single individual.

The support frame 10, shown in FIGS. 4, 5 and 6, can be constructed to support a number of hammers. In practice, it has been found that the support frame can handle five separate hammers effectively. However, a support frame can be used for any number of hammers and, as shown in the drawing, only a single worn hammer 1 is mounted on the support.

The support 10 is formed of angles or similar structural members based o the over-all size of the support frame.

The support frame 10 includes vertically extending legs 12 with an upper horizontally extending support member 14 mounted on the legs. The support member 14 has an upper planar horizontal support surface 16. A V-shaped recess 18 is cut in the surface 14 to receive the V-shaped section 6 of the hammer 2. This recess must be very accurately formed so that the hammer is held in a rigid position and is exactly located relative to the finished wearing surface 5 of the head 2 of the hammer 1. As can be seen in FIG. 4, the V-shaped section 6 fits exactly within the recess 18, so that the remainder of the head 2 projects upwardly from the recess.

The surface 14 of the support frame 10, as seen in FIG. 5, has the recess 18 located on opposite sides of a rectangular cut out 20, larger in the long direction of the support frame so that the eye 3 of the hammer 1 can be inserted downwardly through the support surface whereby the V-shaped section 6 fits into the recess 18. Accordingly, if the hammer 1*a*, with the different shaped section 6*a* is used, as in FIG. 3, the recess is shaped accordingly.

As can be seen in FIGS. 4 and 6, steel straps or similar structural sections are provided along the lower part of the support frame on each of the opposite sides of the eye 3 of the hammer head to maintain the hammer steady during the rebuilding operation. A thin steel base plate 24 is provided on the support surface 16 and has cutouts in register with the recesses 18 and forms the opening 20 for the passage of the hammer eye 3 downwardly through the support surface 16 between the straps 22. A graphite plate 26 is mounted on top of the steel plate and is shaped to closely accept the cross-sectional shape of the head 2 of the hammer 1 at a location above the V-shaped section 6. In one embodiment, the base plate 24 is a $\frac{1}{4}$" thick and the graphite plate 1" thick. A sealing paste 28 is applied to the opening formed in the graphite plate to receive the head. For ease in assembly, the graphite plate can be split in half.

In FIG. 4, a mold 30 is shown schematically, resting on the top surface of the graphite plate 26. The thickness dimension of the steel base plate 24 and of the graphite plate 26, along with the mold, are selected so that the wearing surface 5 of the hammer head 2 can be returned to its original dimension relative to the opposite end of the hammer. The mold 30 is described subsequently in more detail and includes a mold chamber 32, which receives the worn head 2 and has a horizontal upper surface 34 defining the upper limit of the chamber and arranged to form the finished wearing surface 5 of the head 2. It can be seen in FIG. 4, that the worn surface 5' is spaced downwardly from the upper surface 34 of the mold chamber 32.

Figure 7:
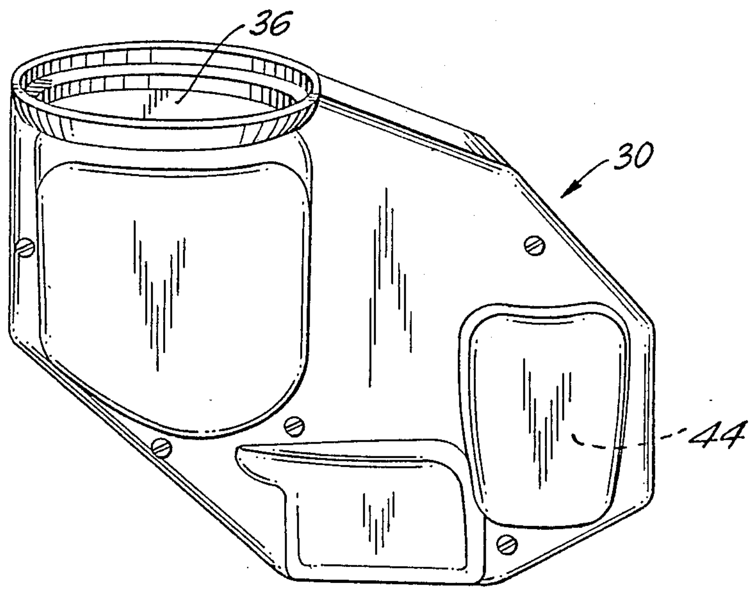
FIG. 7 is an enlarged perspective view of a mold for use on the support frame shown in FIG. 4.
Figure 8:
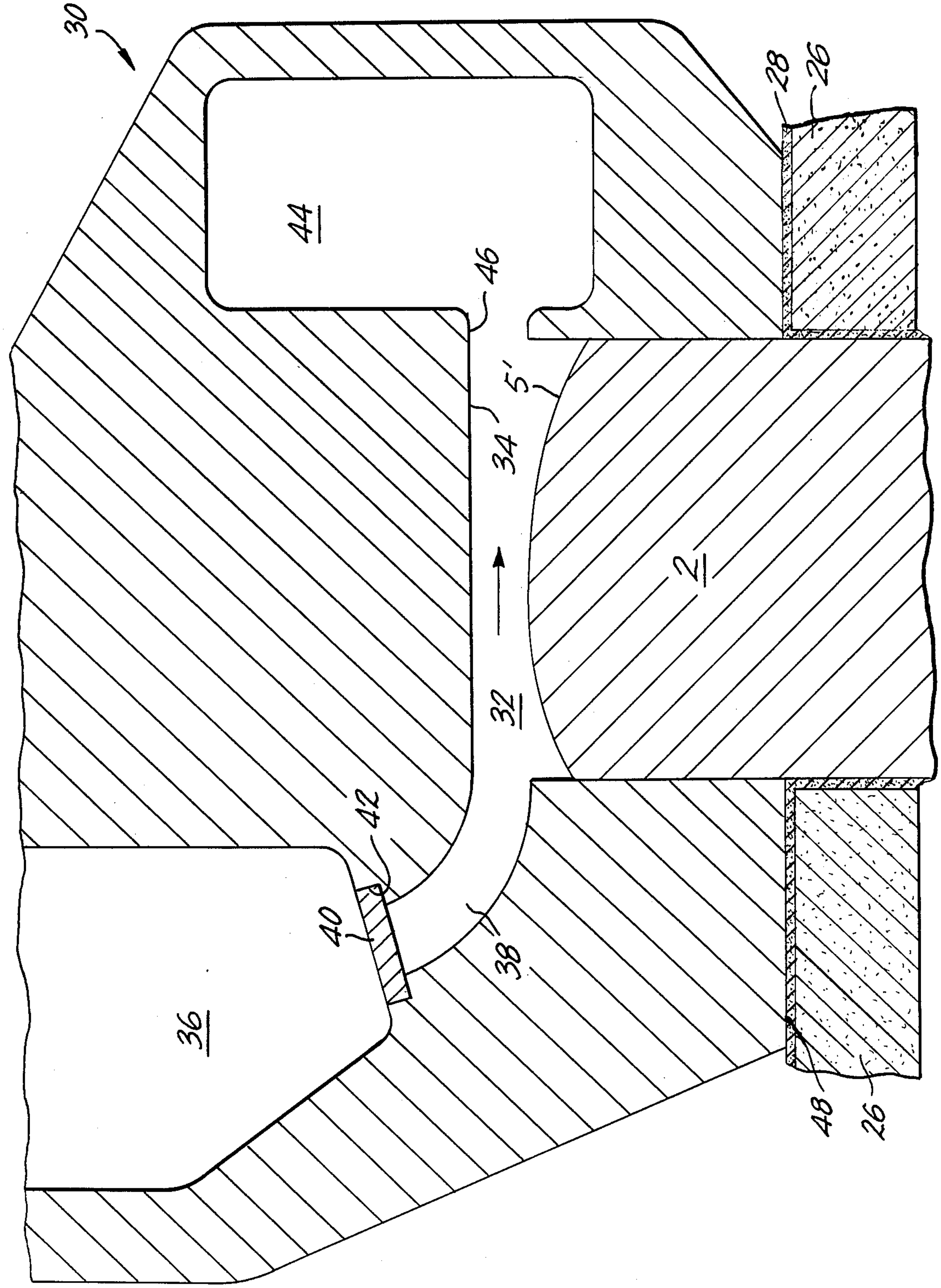
FIG. 8 is a sectional view of the mold shown in FIG. 7.

In FIG. 7, an exterior view of the mold 30 is shown. In FIG. 8, a cross-section of the mold is illustrated resting on the graphite plate 26 with the sealing paste 28 positioned between the opening formed within the graphite plate 26 and the worn hammer head 2 and between the upper surface of the graphite plate and the bottom surface of the mold 30. The worn surface 5' of the hammer head 2 is spaced downwardly from the upper surface 34 of the mold cavity 32. The surface 34 is located at the selected over-all length dimension of the hammer 1 from the lower end of the eye 3.

A crucible cavity 36 is formed within the mold 30 with the lower end of the cavity located above the upper surface 34 of the mold chamber 32. A passageway 38 connects the lower end of the crucible cavity 36 with the upper end of the mold chamber 32. A steel tapping disc 40 is seated within a recess 42 at the upper end of the passageway 38 and forms a closure for the passageway. On the opposite side of the mold a sump cavity 44 communicates with the upper end of the mold chamber 32 through an opening 46. The sump cavity 44 extends downwardly below the upper surface 34, and also upwardly above the upper surface 34 within the mold chamber 32.

The mold has a planar lower surface 48 which rests on the graphite plate 26. The mold 30 is a sand-resin mold and is formed exactly to the dimensions of the hammer head extending normally of the vertical. The mold is formed of two mating parts which can be secured together after the hammer head 2 is enclosed by the graphite plate.

In rebuilding the wearing surface 5 on the head 2, initially an amount of exothermic material in excess of the amount required to rebuild the wearing surface of the hammer is filled into the crucible cavity 36. If necessary, a graphite pipe, not shown, can be placed on top of the mold aligned above the crucible cavity for increasing the volume of the cavity for the exothermic mixture.

The exothermic material is formed of 21.5% aluminum powder, 70.2% millscale (18% FeO), 2.9% graphite powder, 1.0% high carbon ferromanganese, 2.9% Nickel Oxide Sinter 75, and 1.5% low carbon ferrochromium.

The exothermic mixture is ignited by conventional means and the exothermic reaction is completed in about 30 seconds, with molten slag and metal forming two layers, the slag floating on top of the metal. After another ten seconds, the steel tapping disc 40 melts and the molten metal flows downwardly from the crucible cavity 36 through the passage 38 into the mold chamber 32. As the molten metal flows over the top or worn surface 5' of the hammer head 2, it preheats the worn surface of the head to the desired welding temperature and then flows into the sump cavity. The following molten metal fills the mold chamber 32 up to the level of the upper surface 34 with a portion of the molten metal remaining in the passageway 38 and possibly in the bottom of the crucible cavity 36. The slag formed in the exothermic reaction collects on top of the metal within the bottom of the crucible cavity 36.

After the metal has ceased to flow, it freezes and becomes welded to the worn surface 5' of the hammer head 2, returning the wearing surface 5 to its original shape and dimension from the bottom of the hammer eye 3. The molten metal is allowed to cool for about 30 minutes and during this period some of the mold drops off. After 30 minutes, the mold is broken away and the hammer can be removed from the stand. After further cooling to near ambient temperature, the gate, extending from the crucible cavity to the mold chamber, and the sump are fractured off and any remaining excess weld material can be removed, such as by grinding. The rebuilt hammers are then checked to assure that the hammers meet the established specifications.

The support frame 10 can be mounted on casters or wheels for ease in transporting hammers to various work stations.

By using the above exothermic mixture, the weld deposited on the head 2, for reconstituting the original wearing surface 5, is made up of about 3% carbon, 0.6% manganese, 1% silicon, 4.5% nickel, 1.5% chromium and the remainder iron. As a result, a hardened wear resistant material is formed similar to Ni-Hard. The original hammer which is forged, is heat treated after the forging operation. The wearing surface rebuilt in accordance with the present invention, does not require any further heat treatment and provides a wearing surface with improved resistance to abrasive wear as compared to the original forged hammers. To date, hammers rebuilt in accordance with the present invention have been found to have an effective lifetime of about twice that of the original forged hammers which were heat-treated.

Figure 9:
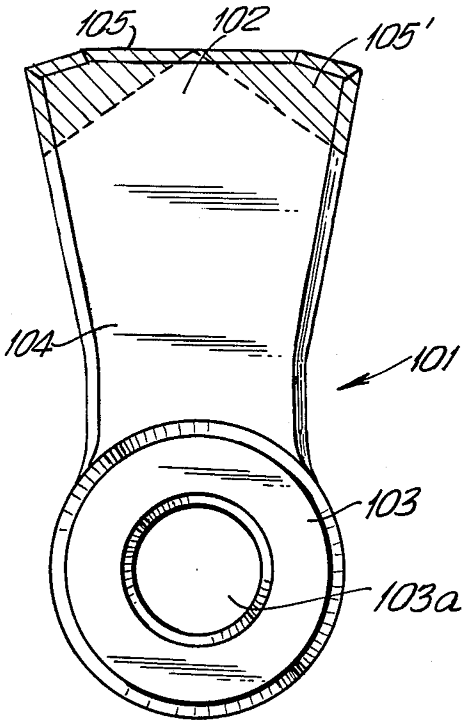
FIG. 9 is an elevational view of another hammer, larger as compared to the hammers in FIGS. 1–3.
Figure 10:
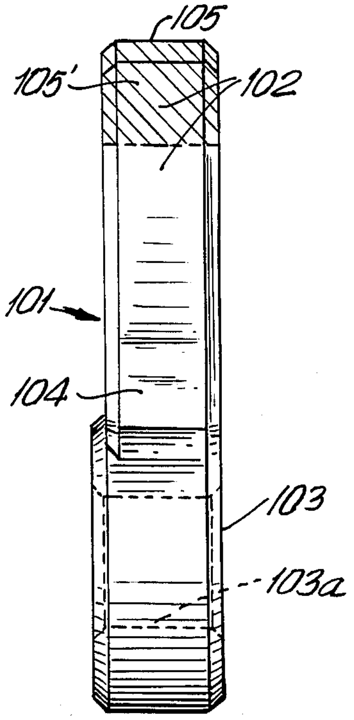
FIG. 10 is a side elevational view of the hammer displayed in FIG. 9.

In FIGS. 9 and 10, a larger sized hammer 101 is illustrated which cannot be rebuilt conveniently in the support frame 10 shown in FIGS. 4–6. The hammer 101 has a starting weight of approximately 230 pounds. Further, it does not have a configuration similar to the head illustrated in FIGS. 1–3, which would permit the support of the hammer by the shaped section 6, **6*a*, as shown in FIGS. 1 and 3** respectively.

The hammer, elongated in the vertical direction, as viewed in FIGS. 9 and 10, has a head 102 at the upper end, an eye 103 at the lower end and a shank 104 extending between the eye and the head. The upper surface 105 of the head is its wearing surface and cooperates with a housing surface, not shown, for pulverizing different materials.

The upper surface 105 is flat or planar, on both sides of the vertical center line and then is beveled outwardly and downwardly to the opposite ends of the surface. From the beveled ends of the surface 105, the sides of the head taper inwardly toward one another and, closely above the eye 103, the sides extend generally parallel down to the eye. The eye has a central opening **103*a*** arranged to be mounted on a shaft, so that a plurality of the hammers can be rotated about the shaft axis for effecting a breaking or pulverizing action.

As can be seen in FIG. 10, one vertical face of the head 102 and shank 104 is stepped inwardly as compared to the opposite face. This inset arrangement is provided to prevent any interference between adjacent hammers as they are rotated on the shaft.

During use, the wearing surface 105 of the head 102, wears down as the hammer is rotated. The leading edge of the hammer becomes worn. The typical wear of the hammer head is shown by the hatched sections in FIGS. 9 and 10. During operation, as the leading edges of the hammers become worn to the extent shown by the hatching, the hammers are reversed on the shaft so that the leading end becomes the trailing end and gradually the reversed leading end wears down. When both edges of the hammer have become worn as shown by the hatching in FIG. 9, the hammers must be replaced.

Because of its weight, the hammer shown in FIGS. 9 and 10 cannot be handled manually, instead a lifting mechanism must be used to position the hammer for rebuilding the worn surface 105′.

Figure 11:
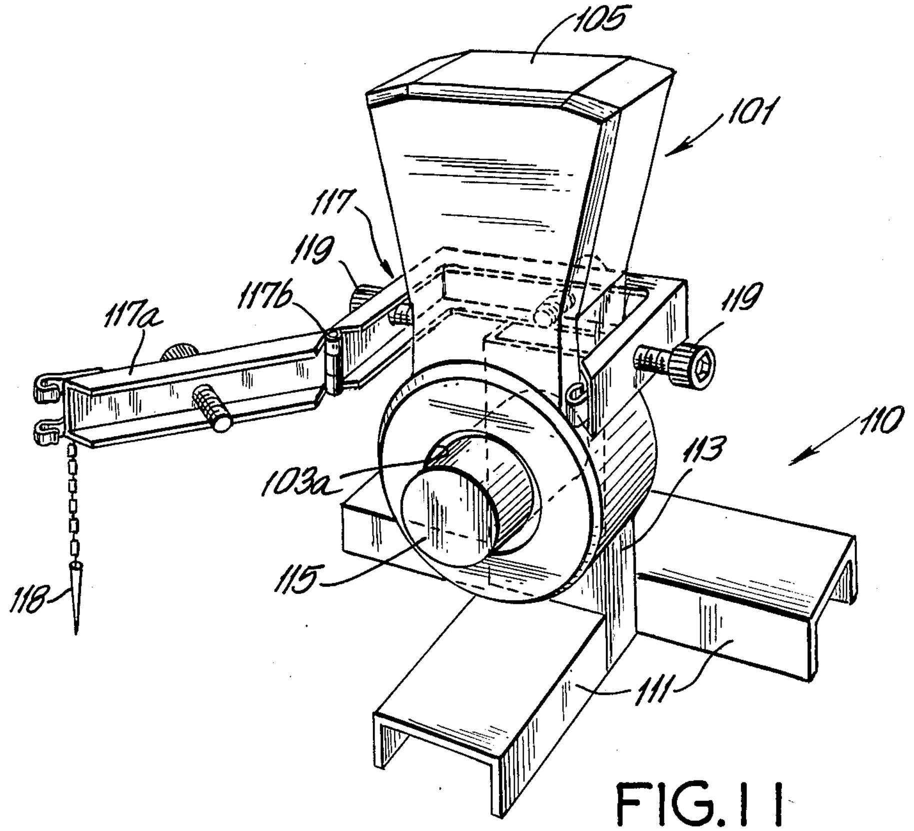
FIG. 11 is a perspective view of the hammer in FIGS. 9 and 10 mounted on a support frame.

In FIG. 11, a support frame 110 is shown including horizontal support members 111 of an inverted channel shape. A vertical support member 113, shown in dashed lines, extends upwardly from the horizontal support members 111. The vertical support member 113 has a horizontally arranged pin 115, projecting outwardly from it, with the pin having a diameter corresponding generally to the diameter of the opening **103*a*** in the eye so that the opening in the eye can be fitted onto the pin for supporting the hammer in the vertical direction.

Above the pin 115, an adjustment frame 117 is supported on the vertical support 113 and is of a sufficient size so that it fits around and is spaced from the shank 104 of the hammer 101. To permit the placement of the hammer on the support frame 110, within the adjustment frame 117, one leg **117*a*, of the adjustment frame is movable about a pivot axis 117*b*, so that it can be opened and closed. A lock pin 118 attached to the opposite end of the leg 117*a* from the pivot axis 117*b* permits the frame to be closed after the hammer is placed on the pin 115. The frame includes four screws 119**, arranged in pairs on opposite sides of the frame, so that by manipulating the screws the hammer can be held in a vertical position.

Figure 12:
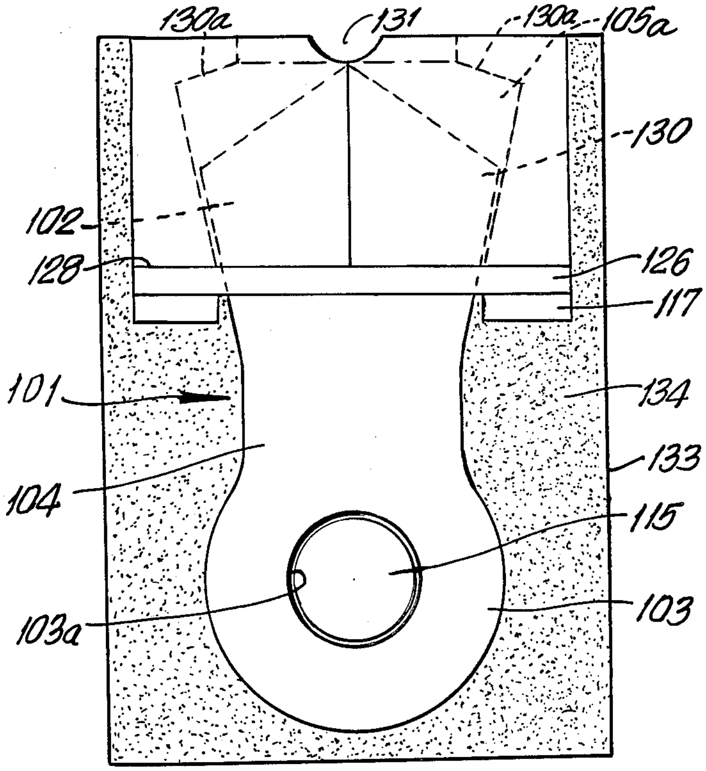
FIG. 12 is a schematic showing of the molding apparatus for rebuilding the hammer of FIGS. 9 and 10.

After the hammer 101 is mounted and plumbed on the support frame 110, the mold is ready to be assembled. Initially, as shown in FIG. 12, a graphite plate 126 is supported on the adjustment frame 117, so that it extends around the worn head 110 at a location spaced vertically below the worn portions 105′. Sealing paste 128 is deposited on the surface of the graphite plate to form a seal. A two-part or two-half sand mold 130 is supported on the graphite plate and completely encloses the sides of the head 102 of the hammer 101. The interior of the sand mold 130 is shaped to correspond to the dimensions of the head.

Due to the precise dimensioning of the pin 115 supporting the eye 103 of the hammer, the location of the adjustment frame 117, and the proper selection of the thickness dimension of the graphite plate 126, the mold 130 is shaped and dimensioned for returning the worn surfaces on the head to its original shape and dimensions.

The mold 130, as can be seen in FIG. 12, has inwardly projecting top surfaces **130*a* for forming the bevels on the top surface 105 of the hammer. The upper edges of the surfaces 130*a* define the finished top surface 105 of the hammer. The mold has an over-flow 131 at the center between the bevels with the invert of the over-flow located at the finished top surface of the head 102**.

The hammer 101, and the various parts forming the mold are enclosed by a light gauge steel shell 133 with the upper edge of the shell spaced slightly below the upper surface of the mold 130. The space between the inside of the shell 133, the hammer, and the mold, is filled with loose sand 134 to guard against leakage of weld metal and to insulate the hammer.

Figure 13:
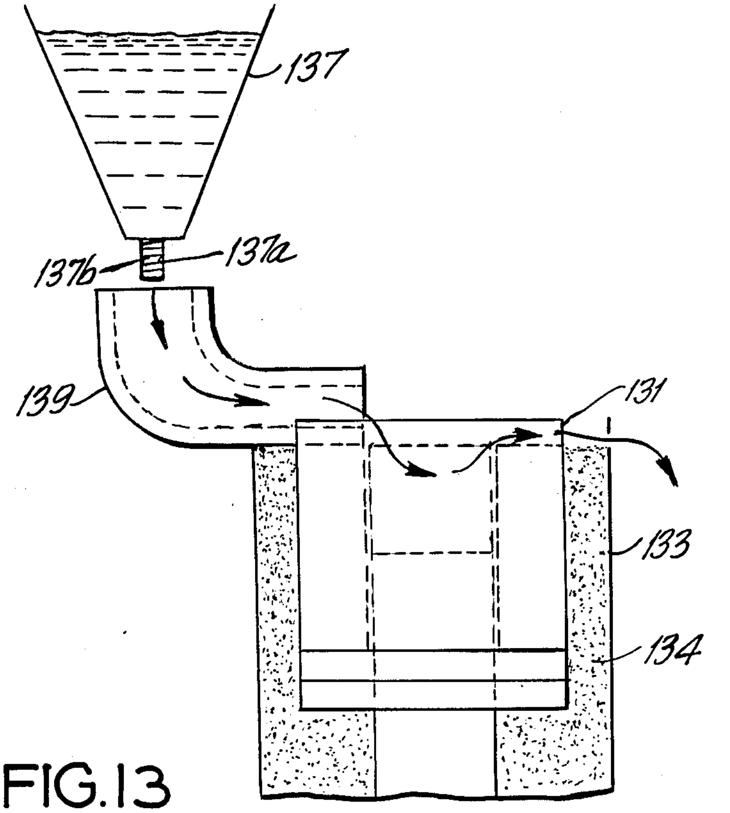
FIG. 13 is a schematic view of the molding apparatus and the means for flowing the thermite mixture in the molding apparatus.

After the arrangement shown in FIG. 12 is completed, the worn hammer is ready to be rebuilt. In FIG. 13, the hammer and mold are shown turned 90° as compared to FIG. 12. As distinguished from the mold arrangement shown in FIGS. 7 and 8, for molding the worn surfaces of the smaller hammer 1, a separate thermic crucible 137 is spaced above the mold 131, with an outlet 137*a* closed by a automatic tapping thimble 137*b*.

A ceramic pouring cup 139 is located below the outlet 137*a* and forms a 90° bend so that the molten mixture can flow out of the crucible 137 and into the mold 130. The ceramic pouring cup 139 prevents the flow of molten metal from the crucible 137 directly into the mold, because such direct flow would tend to erode the worn surface of the hammer.

In the first part of the specification, an example of an effective exothermic mixture or thermite mixture for larger hammers is set forth. Such mixture would be filled into the crucible 137 with the automatic tapping thimble 137*b* blocking flow through the outlet 137*a*. After the mixture is ignited it takes about 50 seconds for it to become molten and erode the tapping thimble and then flow downwardly through the pouring cup 139 into the mold. The molten metal fills the upper part of the mold 130 up to the invert of the over-flow 131. After sufficient molten metal flows into the mold, any excess will flow out through the over-flow 131 into a catch basin, not shown.

As with the smaller hammer repair described above, the repaired larger hammer is allowed to cool and after a given period of time, the mold is stripped from the hammer, the adjustment frame is opened, and the hammer is lifted, by means of a lifting device, off the pin 115. The rebuilt or repaired hammer is then checked to assure that it meets the established specifications.

While specific embodiments of the invention have been shown and described in detail to illustrate the application of the inventive principles, it will be understood that the invention may be embodied otherwise without departing from such principles.

I claim:

1. Method of rebuilding worn hammers used in hammer mills where the hammer is elongated with a pair of opposite ends in the elongated direction with a head at one end, with the one end forming a wearing surface, extending transversely of the elongated direction and an eye at the opposite end, and the wearing surface on the head becomes worn away during use, whereby the dimension between the wearing surface and the opposite end decreases from a starting dimension, the method comprising the steps of supporting the worn hammer with the elongated dimension thereof being substantially vertical and with the wearing surface located upwardly above the eye, at least laterally enclosing the worn head within a mold forming a mold chamber extending upwardly from the worn surface, providing a seal between the head and the mold below the worn surface, igniting an exothermic material in a space separate from the mold chamber, when the ignited exothermic material forms a molten metal, flowing the molten metal into the mold chamber over the worn surface of the head and filling the mold chamber with the molten metal until the surface of the molten metal reaches the desired dimension between the wearing surface and the opposite end of the hammer.

2. Method, as set forth in claim 1, including the steps of forming a completely enclosed mold chamber containing the worn surface of the head with the mold chamber having an upper surface extending transversely of the elongated direction of the hammer and defining the rebuilt wearing surface.

3. Method, as set forth in claim 2, providing a crucible cavity connected to the mold chamber and located above the mold chamber, forming a closure between the crucible cavity and the mold chamber, melting the closure between the crucible cavity and the mold chamber by means of the molten metal formed by the ignited exothermic material so that the molten metal can flow into the mold chamber.

4. Method, as set forth in claim 3, forming a sump cavity in flow communication with the mold chamber with the sump cavity extending downwardly below and upwardly from the upper surface of the molding chamber.

5. Method, as set forth in claim 4, flowing the molten metal from the crucible cavity through the mold chamber into the sump cavity for preheating the worn surface of the hammer head to a desired welding temperature and filling the mold chamber with the molten exothermic material for rebuilding the wearing surface of the head.

6. Method, as set forth in claim 1, forming the mold chamber with an overflow at the level of the rebuilt wearing surface and filling the molten metal into the mold chamber until the level of the molten metal reaches the overflow, and collecting the molten metal flowing over the overflow.

7. Method, as set forth in claim 1, permitting the molten metal within the mold chamber to cool and become welded to the worn head, and after a predetermined cooling period, removing the mold and any excess material from the rebuilt head.

* * * * *